(12) United States Patent
Barta et al.

(10) Patent No.: US 6,438,473 B1
(45) Date of Patent: Aug. 20, 2002

(54) METHOD AND SYSTEM FOR CONTROL OF A VARIABLE FORCE DAMPER

(75) Inventors: David J. Barta, Dayton, OH (US); Olivier Raynauld, Senlis; Olivier Valee, Paris, both of (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/821,550

(22) Filed: Mar. 29, 2001

(51) Int. Cl.$^7$ .................................................. G06F 7/00
(52) U.S. Cl. ..................... 701/37; 280/5.504; 280/5.515
(58) Field of Search ....................... 701/1, 37; 188/276, 188/277; 280/5.504, 5.507, 5.515

(56) References Cited

U.S. PATENT DOCUMENTS 5,570,288 A * 10/1996 Badenoch et al. ............ 701/37
5,570,289 A * 10/1996 Stacey et al. .................. 701/37
5,606,503 A * 2/1997 Shal et al. ...................... 701/1

\* cited by examiner

Primary Examiner—Gertrude Arthur
(74) Attorney, Agent, or Firm—Scott A. McBain

(57) ABSTRACT

A method and system for controlling a vehicle suspension system comprise determining a relative velocity between a wheel and a corresponding corner of the vehicle, and determining responsive to the relative velocity a raw wheel demand force. The method and system also comprise determining a relative position between the wheel and the corresponding corner of a vehicle body, determining a scale factor responsive to the relative position of the wheel, modifying the raw wheel demand force as a function of the scale factor to determine a scaled wheel demand force, and controlling the vehicle suspension system responsive to the scaled wheel demand force.

21 Claims, 4 Drawing Sheets

METHOD AND SYSTEM FOR CONTROL OF A VARIABLE FORCE DAMPER

TECHNICAL FIELD OF THE INVENTION

This invention relates to a variable force suspension system.

BACKGROUND OF THE INVENTION

Known variable force suspension systems include variable force shock absorbers and/or struts that provide suspension-damping forces at a magnitude controllable in response to commands provided by a suspension system controller. Some systems provide control between two damping states and others provide continuously variable control of damping force.

In a known manner of control of a variable force suspension, the demand force for each variable force damper is determined responsive to a set of gains, the wheel vertical velocity and the body heave, roll and pitch velocities. An example system determines the body demand force as follows: $DF_b = G_h H' + G_r R' + G_p P'$, where $DF_b$ is the demand force, $G_h$ is the heave gain, $G_r$ is the roll gain, $G_p$ is the pitch gain, $G_w$ is the wheel velocity gain, H' is the body heave velocity, R' is the body roll velocity, and P' is the body pitch velocity. A control signal representing the determined body demand force is output to control the variable force damper responsive to the demand force. Example systems are described in U.S. Pat. Nos. 5,235,529; 5,096,219; 5,071,157; 5,062,657; 5,062,658; 5,570,289; 5,606,503; 5,579,229; 5,559,700; 5,510,988; and 5,570,288.

Modules are typically used by variable force damper systems for identifying and controlling different aspects of automotive control. The modules typically use specialized algorithms designed for interpreting the automobile's input forces for a preferred control signal. In addition to the body control module described above, wheel and handling modules are also typically included in a complete suspension control system. One module known in the art commands individual damper outputs to a minimum damping state whenever the applicable desired force and damper wheel to body velocity signals are opposite in sign (a state in which the given damper is said to be in an "active" quadrant). Within the limits of damper travel for small to medium-sized inputs, this approach provides acceptable vehicle body motion control. However, on larger inputs that cause the limits of damper travel to be tested, the absence of damping in the "active" quadrants can allow very undesirable compression and/or rebound bumpstop impacts. In this context, compression and rebound bumpstops are defined as damper positions at which either full metal to metal impact and/or compression of one or more hard rubber parts occurs. To this end, wheel-to-body relative position-based "electronic bumpstop" algorithms have been used. Adversely, it has typically been difficult for the existing bumpstop algorithms known in the art to satisfactorily improve compression and/or rebound bumpstop impact energy without undesirable side effects on inputs that do not require the bumpstop algorithm use.

Therefore, it would be desirable to have an algorithm that would improve upon the above-mentioned situation, and related situations in which system control is released prematurely. Such an algorithm may provide superior gross motion control and reduced compression and/or rebound bumpstop activation during large events. Ideally, the algorithm would provide bumpstop and improved body motion control with minimal, if any, sacrifice in ride comfort and impact isolation.

SUMMARY OF THE INVENTION

The present invention is a method and system for controlling a vehicle suspension system. The method and system comprise determining a relative velocity between a wheel and a corresponding corner of the vehicle, and determining responsive to the relative velocity a raw wheel demand force. The method and system also comprise determining a relative position between the wheel and the corresponding corner of a vehicle body, determining a scale factor responsive to the relative position of the wheel, modifying the raw wheel demand force as a function of the scale factor to determine a scaled wheel demand force, and controlling the vehicle suspension system responsive to the scaled wheel demand force.

The features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE INVENTION

Figure 1:
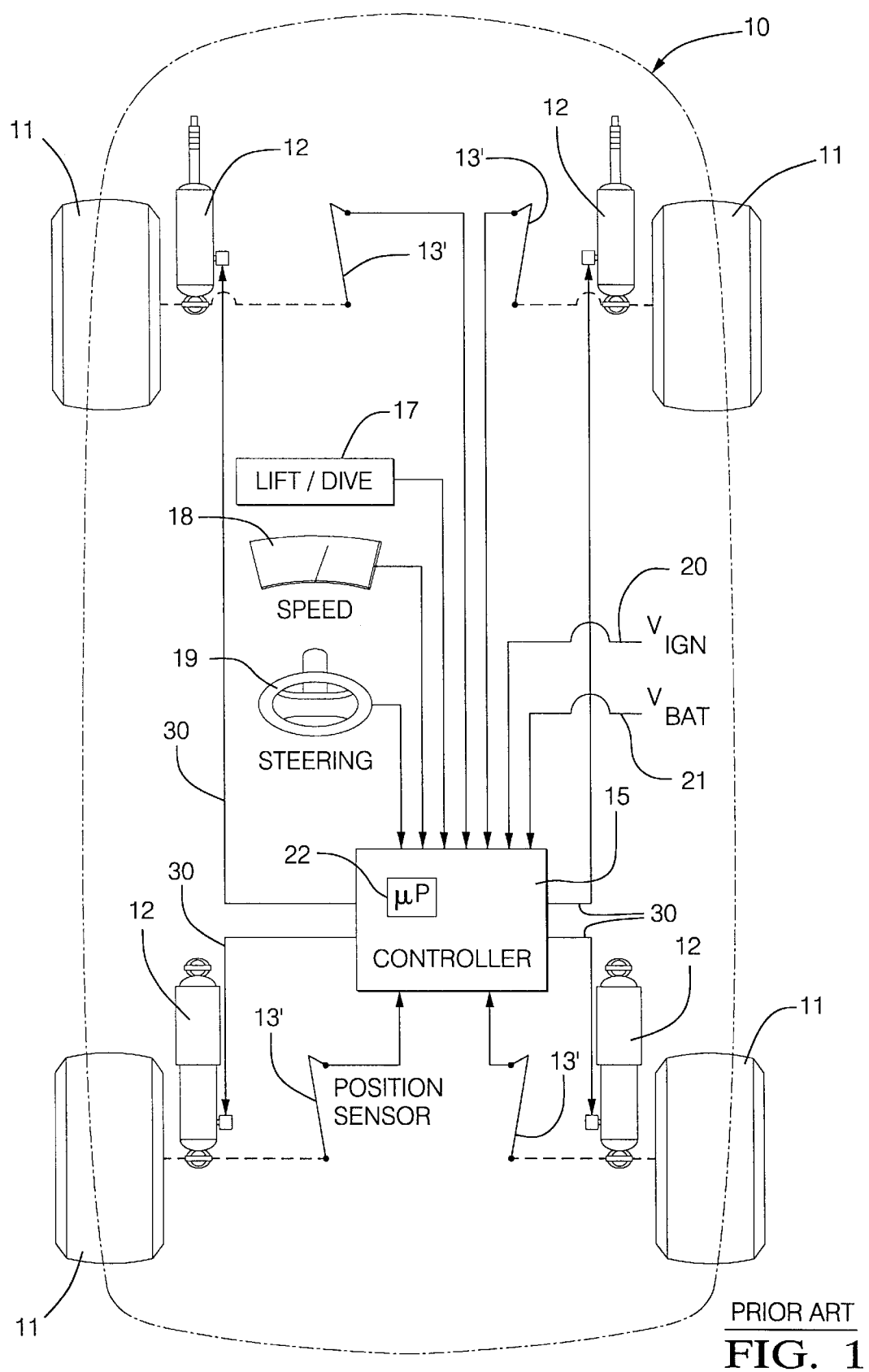
FIG. 1 illustrates a variable force damper system for a motor vehicle.

FIG. 1 shows an example apparatus for implementation of this invention generally comprising a vehicle body 10 supported by four wheels 11 and by four suspensions including springs of a known type (not shown). Each suspension includes a variable-force real time controllable damper 12 connected to exert a vertical force between wheel 11 and body 10 at that suspension point. Although many such suspension arrangements are known and appropriate to this invention, actuator 12 of this embodiment comprises an electrically controllable, variable force damper in parallel with a weight bearing coil spring in a parallel shock absorber/spring or McPherson strut arrangement. A description of a variable force damper suitable for use as actuator 12 is the continuously variable damper described in U.S. Pat. No. 5,282,645, the disclosure of which is hereby incorporated by reference.

Each corner of the vehicle includes a linear position sensor 13 that provides an output signal indicative of the relative distance between the vehicle wheel and the suspended vehicle body at that corner of the vehicle. Suitable position sensors 13 can be easily constructed by those skilled in the art. The outputs of the position sensors 13 may be differentiated to produce relative body-wheel vertical velocity signals for each corner of the vehicle and may be used to determine the body modal velocities of body heave velocity, body roll velocity and body pitch velocity.

An example position sensor 13 includes a rotary resistive device mounted to the vehicle body and a link pivotally coupled between both the vehicle wheel and a pivot arm on the rotary resistive device such that the rotary resistive device provides an impedance output that varies with the relative position between the wheel 11 and the corner of the body 10. Each position sensor 13 may further include an internal circuit board with a buffer circuit for buffering the output signal of the rotary resistive device and providing the buffered signal to a controller 15. Suitable position sensors 13 can be easily constructed by those skilled in the art. Any alternative type of position sensor, including transformer type sensors, may be used as position sensor 13.

The outputs of relative position sensors 13 are provided to the controller 15, which processes the signals to determine the states of vehicle body 10 and wheels 11 and generates an output actuator control signal for each variable actuator 12. These signals are applied from controller 15 through suitable output apparatus to control actuators 12 in real time. Input signals for the determination of the output actuator control signals may also be provided to microcomputer to provide anticipation of vehicle pitch (lift/dive) 17 or by a vehicle speed sensor 18 and a steering wheel angular position sensor 19 to provide anticipation of vehicle roll. Obtaining such signals is easily achieved through the use of known types of sensors available to those skilled in the art.

Figure 2:
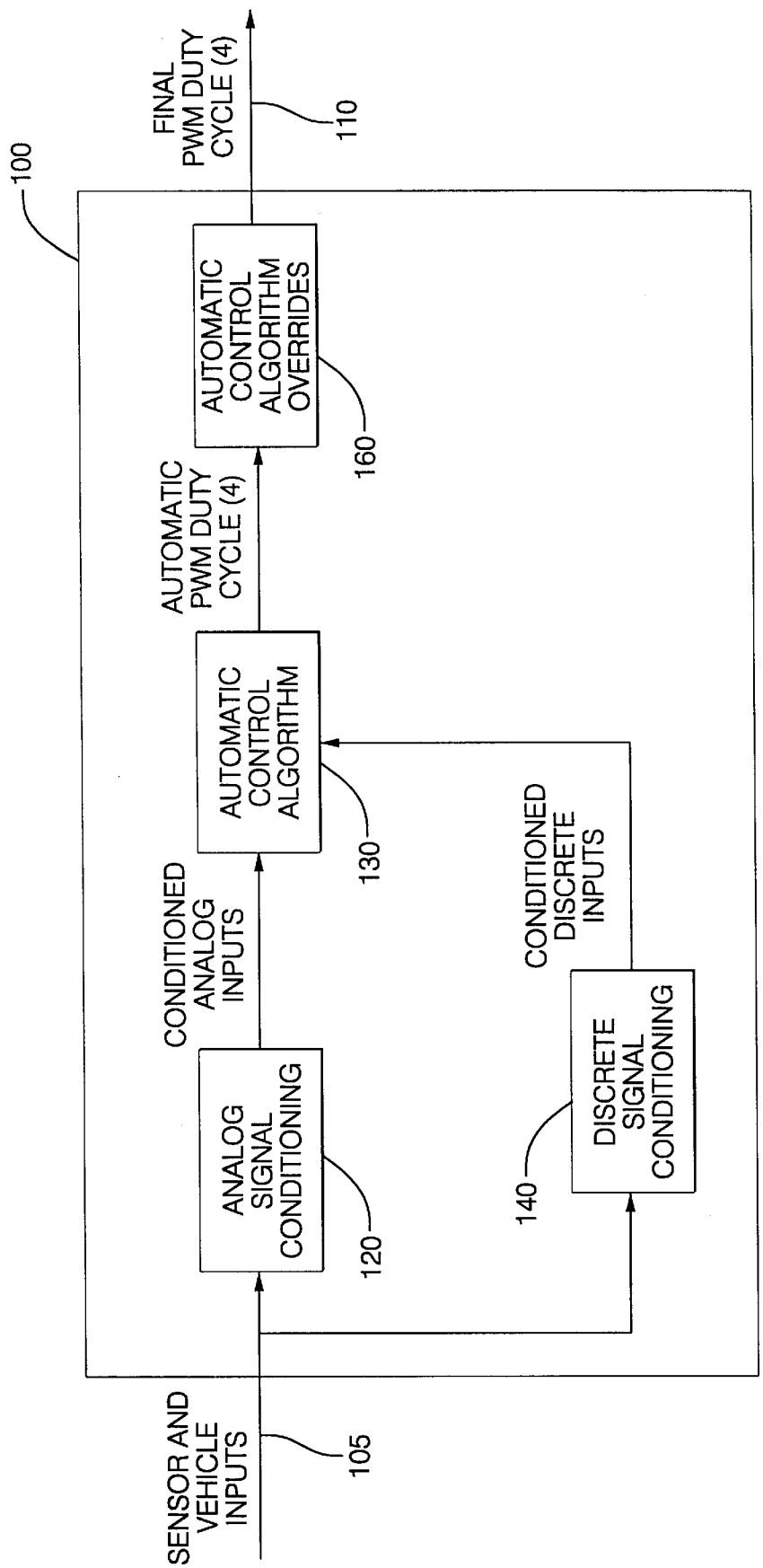
FIG. 2 is a block diagram of one embodiment of a continuously variable real-time damping control module algorithm in accordance with the invention.

FIG. 2 shows one embodiment of a continuously variable real-time damping (CVRTD) control module algorithm 100. It should be appreciated, however, that the present invention is also applicable in a magneto-restrictive (MR) CVRTD. Sensor (also called vehicle sensor) and vehicle inputs 105 may include measured vehicle variables and preset constants, which flow to and from individual modules altering the input conditions through multiple processes. Vehicle inputs can be any static or variable input that is not provided by a sensor. The resultant signals provide distinct damping system commands at output 110. CVRTD is one embodiment of a variable force damping system and is used throughout the detailed description of the invention, but it should be appreciated that alternate damping systems may also be used. In the CVRTD control module algorithm 100, information is processed through internal modules providing analog signal conditioning 120, an automatic control algorithm 130, discrete signal conditioning 140, and an automatic control algorithm override module 160. It is in the automatic control algorithm 130 of this embodiment that the present invention resides.

Figure 3:
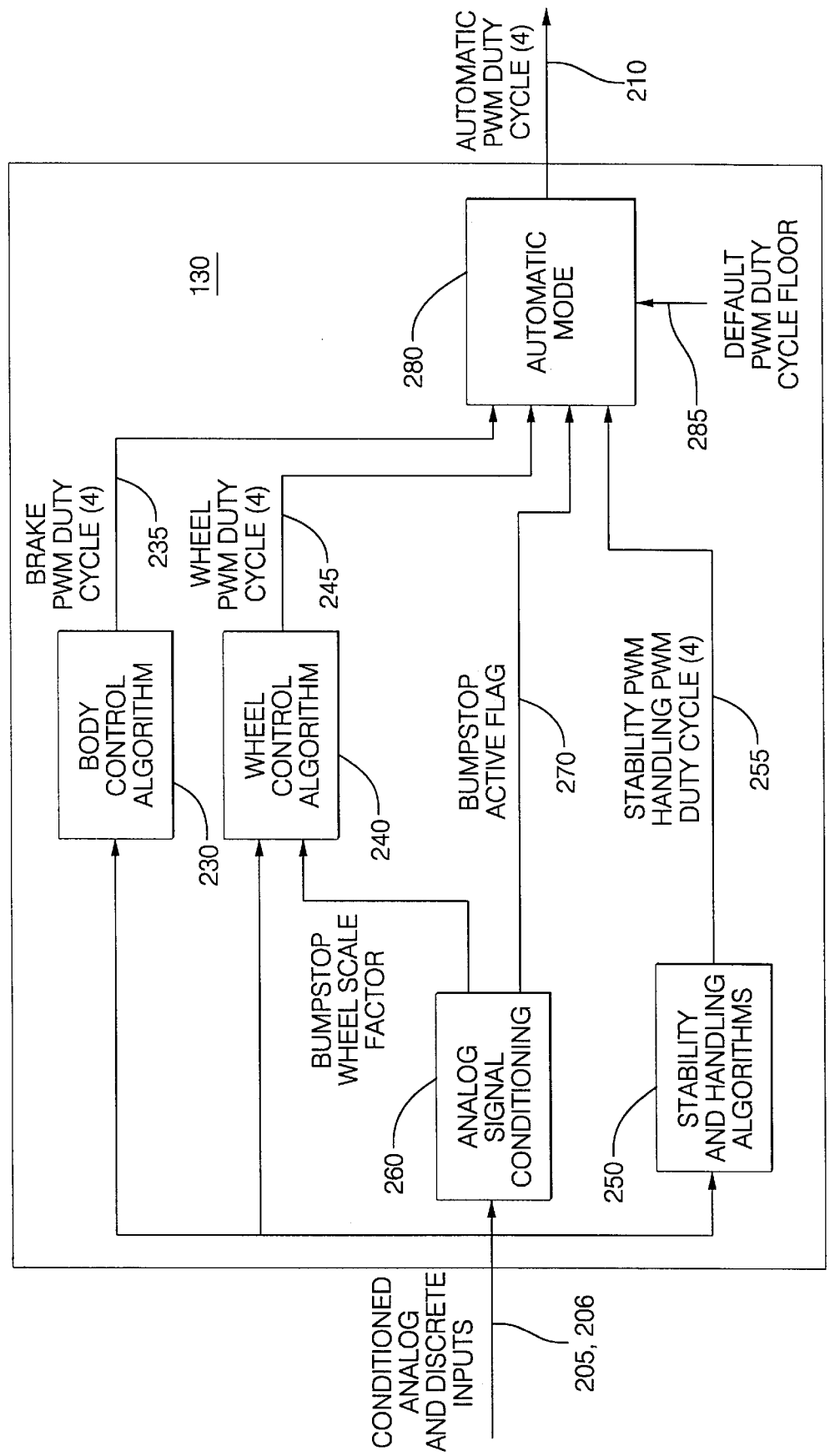
FIG. 3 is a block diagram of one embodiment of an automatic control module algorithm imbedded in the continuously variable real-time damping control module algorithm of FIG. 1.

FIG. 3 presents one embodiment for the automatic control algorithm 130, and illustrates conditioned analog inputs 205, conditioned discrete inputs 206 and outputs 210 as well as the internal processes required to provide for the outputs 210. The internal processes for this embodiment of the automatic control algorithm 130 provide the following functionality shown as modules:

Body Control Algorithm 230
Wheel Control Algorithm 240
Stability and Handling Algorithms 250
Electronic Bumpstop Algorithm 260
Automatic Mode Pulse Width Modulation (PWM) Duty Cycle Determination and Scaling 280

The inputs 205/206 are a processed and unprocessed subset of the sensor and vehicle inputs 105. Outputs from the automatic control algorithm 130 consist of an automatic PWM duty cycle 210. Output 265 from module 260 is used in module 240 to generate output 245. Additionally the outputs 235, 245, and 255 from respective modules 230, 240, and 250, and a default PWM duty cycle floor calibration 285 are shown as input variables to the automatic mode PWM duty cycle determination 280. The output 210 is used by the CVRTD control module algorithm 100 for further processing. The above-mentioned software functional blocks illustrate one embodiment for modular implementation of the automatic control algorithm 130. The actual implementation may vary from the structure illustrated in FIG. 3. The body control algorithm 230, wheel control algorithm 240, and stability and handling algorithms 250 are all known to the art.

In one embodiment of the invention, the suspension damping system may use actuators that are controlled by a PWM (Pulse Width Modulation) signal. However, actuators of another type not based on PWM signals can be substituted in alternative embodiments. Within alternative embodiments, reference to PWM signals may be named "damping command" to designate command signals to alternative actuators. It will be recognized that variable force controls other than those with PWM are equivalent to the PWM controlled signal example set forth herein.

Figure 4:
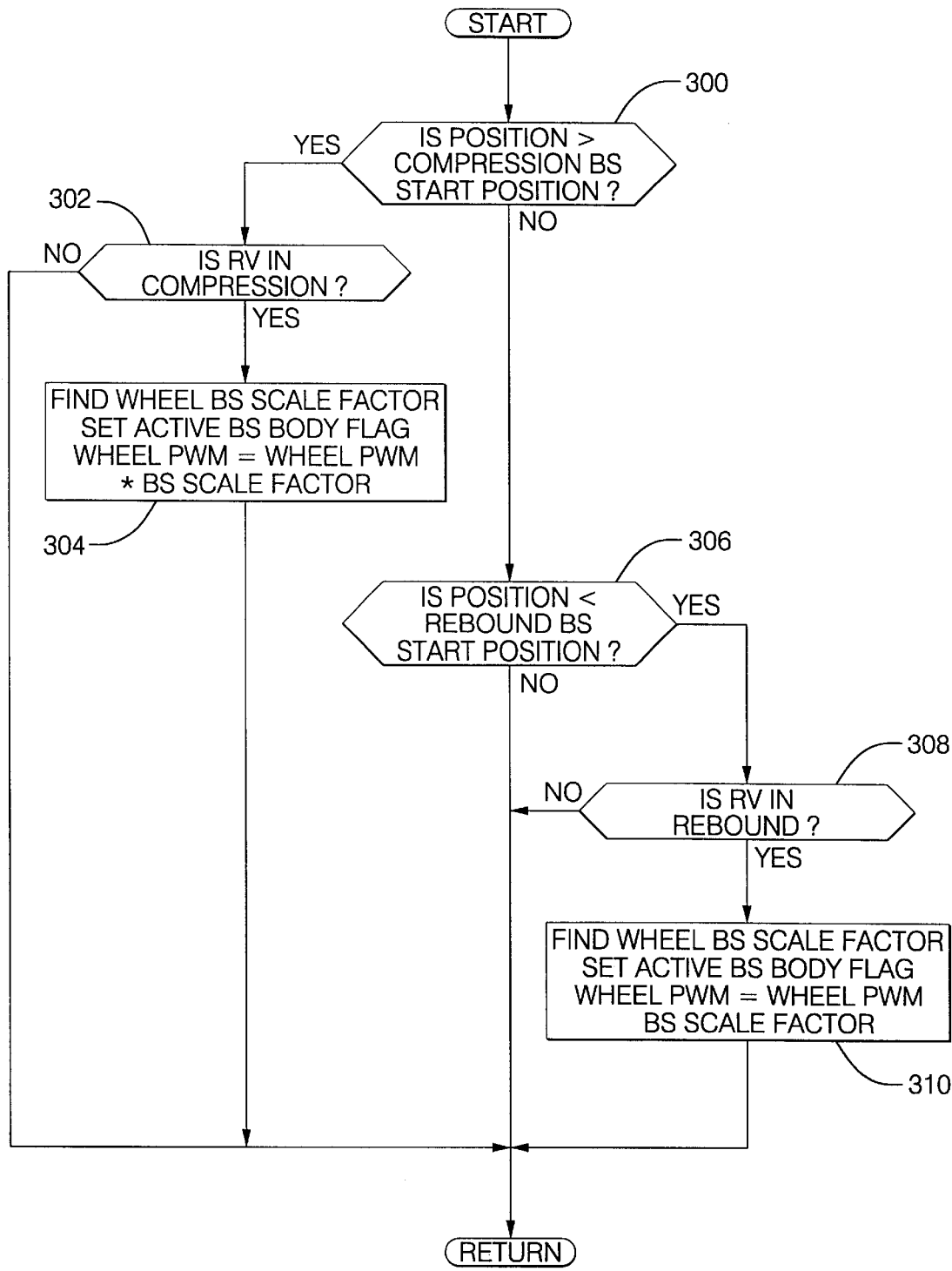
FIG. 4 is a block diagram of one embodiment of a bumpstop control algorithm imbedded in the automatic control module algorithm of FIG. 3.

FIG. 4 shows the logic of the bumpstop control algorithm. At block 300, the system first determines whether the position of the damper shows the damper to be is a predefined compression region, which might for instance constitute the last 20% or so of travel. If the damper is in the compression region, the system then determines at block 302 whether the relative velocity of the damper shows the damper to be traveling into further compression. If this determination is negative, i.e. the damper is in rebound, then the system simply returns to the start block. If the determination is positive, however, the system as shown in block 304 then looks up a wheel bumpstop scale factor. In a preferred embodiment, this compression bumpstop area scale factor may simply be a linear function between one and about 300% of the maximum scale factor for positions between the beginning of the compression bumpstop area and perhaps 95% of possible damper travel. Above 95% possible damper travel, the scale factor is set at the 300% level. The wheel PWM is then set equal to the existing wheel PWM times the scale factor, and the algorithm returns to the beginning.

If at block 300 the system determines that the damper is not in the compression region, it then determines at block 306 whether the damper is instead in the rebound bumpstop area that might constitute the opposite final 20% or so of the damper travel. If the damper is not in the rebound region, the system returns to the start block. If the damper is in the rebound region, the system as shown in block 308 next determines whether the relative velocity of the damper shows the damper to be traveling into further rebound. If not, the system returns to the beginning. If the damper is traveling further into rebound, the system as shown by block 310 then looks up a wheel bumpstop scale factor. In a preferred embodiment, the rebound bumpstop area scale factor may also be a linear function between one and the maximum scale factor for positions between the onset of the rebound compression area and perhaps 5% of possible damper travel. Below 5% of possible damper travel, the scale factor is set at the maximum. The wheel PWM is then set equal to the existing wheel PWM times the scale factor, and the algorithm returns to the beginning. It should be appreciated, of course, that different curves may be implemented for the front and rear wheels.

The scale factors are determined for each corner of the vehicle, and then are output to block 280, as shown in FIG. 3. The scaled wheel demand forces are determined by multiplying each raw wheel demand force by the corresponding scale factor, and the resultant scaled wheel demand control outputs are provided on line 210, which carry the duty cycle commands for the four actuators in the suspension system. The duty cycle commands are converted in a known manner to pulse width modulated signals.

When the damper is in a bumpstop region, the block 260 outputs a bumpstop active flag on line 270. When the bumpstop flag is active, active quadrant moding is disabled in block 280.

The above-described implementations of this invention are example implementation. Moreover, various other improvements and modifications to this invention may occur to those skilled in the art and those improvements and modifications will fall within the scope of this invention as set forth below.

What is claimed is:

1. A method of controlling a vehicle suspension system comprising:

determining a relative velocity between a wheel and a corresponding corner of the vehicle;

determining, responsive to the relative velocity, a raw wheel demand force;

determining a relative position between the wheel and the corresponding corner of a vehicle body;

determining, responsive to the relative position of the wheel, a scale factor, said scale factor comprising a bumpstop scale factor and a rebound scale factor, said scale factor to be the bumpstop scale factor when the relative position between the wheel and the corresponding corner of a vehicle body is in a compression region and the relative velocity is toward said compression region, said scale factor to be the rebound scale factor when the relative position between the wheel and the corresponding corner of a vehicle body is in a rebound region and the relative velocity is toward said rebound region, modifying the raw wheel demand force as a function of the scale factor to determine a scaled wheel demand force; and controlling the vehicle suspension system responsive to the scaled wheel demand force.

2. The method of claim 1 wherein modifying the raw wheel demand force comprises multiplying the raw wheel demand force by the scale factor.

3. The method in claim 1, wherein the compression region is defined to be at or about 80% of possible wheel travel.

4. The method in claim 1, wherein the rebound region is defined to be at or about 20% of possible wheel travel.

5. The method in claim 1, wherein the bumpstop scale factor is a linear function between 1 and 300% of the maximum scale factor.

6. The method in claim 1, wherein the bumpstop scale factor is about 300% of the maximum scale factor when the position of the wheel is above 95% of possible wheel travel.

7. The method in claim 1, wherein the rebound scale factor is at its maximum when the position of the wheel is at or below 5% of possible wheel.

8. An apparatus comprising:

a suspended vehicle body;

four un-suspended vehicle wheels;

four variable force actuators mounted between the vehicle body and wheels at four corners of the vehicle;

four sensors, one sensor mounted at each of the four corners of the vehicle, each sensor comprising one member of a group of sensors comprising: a relative position sensor and a relative velocity sensor; and a microprocessor control unit comprising, for each corner of the vehicle, (a) means for receiving a sensor signal from the sensor mounted at the corresponding corner of the vehicle, (b) means for determining responsive to the sensor signal a raw wheel demand force, (c) means for determining a relative position of the wheel, (d) means for determining, responsive to the relative position of the wheel, a scale factor, said scale factor comprising a bumpstop scale factor and a rebound scale factor, said scale factor to be the bumpstop scale factor when the relative position between the wheel and the corresponding corner of a vehicle body is in a compression region and the relative velocity is toward said compression region, said scale factor to be the rebound scale factor when the relative position between the wheel and the corresponding corner of a vehicle body is in a rebound region and the relative velocity is toward said rebound region, (e) means for modifying the raw wheel demand force as a function of the scale factor to determine a scaled wheel demand force, and means for controlling one of the four variable force actuators responsive to the scaled wheel demand force.

9. The apparatus of claim 8 wherein the means for modifying the raw wheel demand force comprises means for multiplying the raw wheel demand force by the scale factor.

10. The apparatus in claim 8, wherein the bumpstop region is defined to be at or about 80% of possible force actuator travel.

11. The apparatus in claim 8, wherein the rebound region is defined to be at or about 20% of possible force actuator travel.

12. The apparatus in claim 8, wherein the bumpstop scale factor is a linear function between 1 and 300% of the maximum scale factor.

13. The apparatus in claim 8, wherein the bumpstop scale factor is about 300% of the maximum scale factor when the position of the wheel is above 95% of possible force actuator travel.

14. The apparatus in claim 8, wherein the rebound scale factor is at its maximum when the position of the wheel is at or below 5% of possible force actuator travel.

15. A computer readable medium storing a computer program comprising:

computer readable code for determining a relative velocity between a wheel and a corresponding corner of the vehicle;

computer readable code for determining responsive to the relative velocity a raw wheel demand force;

computer readable code for determining a relative position between the wheel and the corresponding corner of a vehicle body;

computer readable code for determining, responsive to the relative position of the wheel, a scale factor; said scale factor comprising a bumpstop scale factor and a rebound scale factor, said scale factor to be the bumpstop scale factor when the relative position between the wheel and the corresponding corner of a vehicle body is in a compression region and the relative velocity is toward said compression region, said scale factor to be the rebound scale factor when the relative position between the wheel and the corresponding corner of a vehicle body is in a rebound region and the relative velocity is toward said rebound region, computer readable code for modifying the raw wheel demand force as a function of the scale factor to determine a scaled wheel demand force; and computer readable code for controlling the vehicle suspension system responsive to the scaled wheel demand force.

16. The computer readable medium of claim 15 wherein the code for modifying the raw wheel demand force comprises computer readable code for multiplying the raw wheel demand force by the scale factor.

17. The computer program in claim 15, wherein the bumpstop region is defined to be at or about 80% of possible wheel travel.

18. The computer program in claim 15, wherein the rebound region is defined to be at or about 20% of possible wheel travel.

19. The computer program in claim 15, wherein the bumpstop scale factor is a linear function between 1 and 300% of the maximum scale factor.

20. The computer program in claim 15, wherein the bumpstop scale factor is about 300% of the maximum scale factor when the position of the wheel is above 95% of possible wheel travel.

21. The computer program in claim 15, wherein the rebound scale factor is at its maximum when the position of the wheel is at or below 5% of possible wheel travel.

* * * * *